United States Patent
Marcussen (10) Patent No.: US 10,746,610 B2
(45) Date of Patent: Aug. 18, 2020

(54) SAFETY CIRCUIT, A SAFETY CIRCUIT OPERATION METHOD AND AN ELECTRICALLY OPERATED MOTOR COMPRISING A SAFETY CIRCUIT

(71) Applicant: Lodam electronics a/s, Sonderborg (DK)

(72) Inventor: Claus Marcussen, Sønderborg (DK)

(73) Assignee: BITZER ELECTRONICS A/S, Sønderborg (DK)

( * ) Notice: Subject to any disclaimer, the term of this patent is extended or adjusted under 35 U.S.C. 154(b) by 247 days.

(21) Appl. No.: 15/739,516

(22) PCT Filed: Jun. 29, 2016

(86) PCT No.: PCT/DK2016/050228
§ 371 (c)(1),
(2) Date: Dec. 22, 2017

(87) PCT Pub. No.: WO2017/000965
PCT Pub. Date: Jan. 5, 2017

(65) Prior Publication Data
US 2018/0188120 A1    Jul. 5, 2018

(30) Foreign Application Priority Data

Jul. 2, 2015    (DK) ................ 2015 70427

(51) Int. Cl.
*G01K 3/00*        (2006.01)
*G01K 15/00*       (2006.01)
(Continued)

(52) U.S. Cl.
CPC .......... *G01K 15/007* (2013.01); *G01K 3/005* (2013.01); *G01K 15/00* (2013.01); *G01K 15/005* (2013.01);
(Continued)

(58) Field of Classification Search
CPC .......... G01K 15/00; G01K 3/005; G01K 7/16; G01K 15/005; G01K 15/007; H02H 5/042;
(Continued)

(56) References Cited

U.S. PATENT DOCUMENTS 4,369,352 A * 1/1983 Bowles ................ F24C 14/02
219/395
4,392,101 A * 7/1983 Saar ...................... H01M 10/44
320/125
(Continued)

FOREIGN PATENT DOCUMENTS

CN    101262128 A    9/2008
CN    203326582 U    12/2013
EP    1967831 A2    9/2008

OTHER PUBLICATIONS

Danish Search Report Application No. PA 205 70427; dated Feb. 2, 2016; pp. 4.

(Continued)

*Primary Examiner* — Gail Kaplan Verbitsky
(74) *Attorney, Agent, or Firm* — Cantor Colburn LLP (57) ABSTRACT

A safety circuit for temperature tripping with redundancy is disclosed. The safety circuit comprises a first temperature evaluation module comprising a first input arranged to receive a first input signal derived from a temperature by means of a temperature-dependent element; the first temperature evaluation module further comprising a first output arranged to provide a first output signal corresponding to said determined first temperature state. The safety circuit further comprises a second temperature evaluation module comprising a second input arranged to receive a second input signal derived from said temperature by means of said temperature-dependent element, the second input signal being different from said first input signal; the second (Continued)

temperature evaluation module further comprising a second output arranged to provide a second output signal corresponding to said determined second temperature state. The safety circuit further comprises a tripping monitoring unit connected to said first and second outputs and being arranged to establish a tripping command signal when at least one of said first and second output signals changes to a trip state. A safety circuit operation method and an electrically powered motor comprising the safety circuit are further disclosed.

20 Claims, 6 Drawing Sheets

(51) Int. Cl.
  *H02H 7/085* (2006.01)
  *H02H 7/08* (2006.01)
  *G05D 23/30* (2006.01)
  *H02H 3/05* (2006.01)

(52) U.S. Cl.
  CPC ............. *G05D 23/30* (2013.01); *H02H 7/08* (2013.01); *H02H 7/0852* (2013.01); *H02H 3/05* (2013.01)

(58) Field of Classification Search
  CPC ...... H02H 7/0852; H02H 7/0833; H02H 6/00; H02H 3/006; H02H 3/085; H02H 5/04; H02H 7/09; H02H 3/16; F23N 2027/18; F23N 2031/10; F23N 5/082; F24C 7/087; G01R 31/40; G05D 23/1928; G05D 23/24; G05D 23/30; G06F 11/3089
  See application file for complete search history.

(56) References Cited

U.S. PATENT DOCUMENTS

| | | | |
|---|---|---|---|
| 4,546,238 A | 10/1985 | Ahs | |
| 4,556,330 A * | 12/1985 | Regtien | G01K 7/21 374/173 |
| 4,631,626 A * | 12/1986 | Bohan, Jr. | G05D 23/24 307/117 |
| 4,694,223 A * | 9/1987 | Campolo | F21V 25/10 315/117 |
| 4,852,544 A | 8/1989 | Williams et al. | |
| 4,854,852 A | 8/1989 | Patton et al. | |
| 6,326,767 B1 * | 12/2001 | Small | H01M 2/1055 320/116 |
| 7,570,002 B2 * | 8/2009 | Peng | G01K 3/005 318/442 |
| 9,071,048 B2 * | 6/2015 | Divan | H02H 3/207 |
| 9,214,797 B2 * | 12/2015 | Hameed | H02H 1/00 |
| 10,424,914 B2 * | 9/2019 | Burkert | H02P 29/0241 |
| 2006/0176630 A1 | 8/2006 | Carlino et al. | |
| 2008/0218110 A1 | 9/2008 | Peng | |
| 2009/0058664 A1 * | 3/2009 | Park | G06F 1/26 340/584 |
| 2010/0316086 A1 * | 12/2010 | Engelstad | G01K 1/14 374/1 |
| 2014/0226248 A1 * | 8/2014 | Hameed | H02H 1/00 361/115 |
| 2014/0358346 A1 | 12/2014 | Katrak et al. | |
| 2015/0009600 A1 | 1/2015 | Aromin et al. | |
| 2015/0033576 A1 * | 2/2015 | Hernandez Jimenez | D06F 58/28 34/524 |
| 2015/0085540 A1 * | 3/2015 | Huang | H02H 3/20 363/56.11 |
| 2016/0146676 A1 * | 5/2016 | Ukegawa | G01K 3/10 374/178 |
| 2017/0370692 A1 * | 12/2017 | Okojie | G01B 7/02 |
| 2019/0214809 A1 * | 7/2019 | Yang | G05B 1/01 |

OTHER PUBLICATIONS

International Serach Report Application No. PCT/DK2016/050228; dated Sep. 6, 2016; pp. 2.
Chinese Office Action for Chinese Patent Application No. 201680038142.4; dated Apr. 16, 2019.
Office Action for Chinese Patent Application No. 201680038142.4 dated Dec. 3, 2019.

* cited by examiner

SAFETY CIRCUIT, A SAFETY CIRCUIT OPERATION METHOD AND AN ELECTRICALLY OPERATED MOTOR COMPRISING A SAFETY CIRCUIT

FIELD OF THE INVENTION

The present invention relates to safety devices for redundant temperature tripping.

BACKGROUND OF THE INVENTION

Reliability of safety devices for example to automatically shut down electric equipment in case of errors, e.g. excessive heating, in order to avoid damage, fire, or personnel accidents, is an increasing concern and requirement.

A conventional way to improve reliability of the safety devices themselves has been to duplicate the error detecting circuit and thereby provide a redundant system with two evaluation channels operating in parallel on the measurement signal from a thermistor in the electric equipment. Such a system is redundant only to non-typical component faults in one of the evaluation channels. In more sophisticated systems the two evaluation channels have been implemented with fundamentally different technology, but still receive the same thermistor signal and compare to the same reference value, thereby still limiting the redundancy effect to the evaluation components themselves.

SUMMARY OF THE INVENTION

The inventor has identified the above-mentioned challenges and problems with redundant safety circuits and invented new and useful measures to improve the redundancy effect and reliability of safety circuits as described in the following.

The invention relates to a safety circuit for temperature tripping with redundancy, the safety circuit comprising: a first temperature evaluation module comprising a first input arranged to receive a first input signal derived from a temperature by means of a temperature-dependent element; the first temperature evaluation module being arranged to evaluate said first input signal and determine a first temperature state as one of at least two states, whereof at least one state is a trip state; the first temperature evaluation module further comprising a first output arranged to provide a first output signal corresponding to said determined first temperature state; a second temperature evaluation module comprising a second input arranged to receive a second input signal derived from said temperature by means of said temperature-dependent element, the second input signal being different from said first input signal; the second temperature evaluation module being arranged to evaluate said second input signal and determine a second temperature state as one of at least two states, whereof at least one state is a trip state; the second temperature evaluation module further comprising a second output arranged to provide a second output signal corresponding to said determined second temperature state; and a tripping monitoring unit connected to said first and second outputs and being arranged to establish a tripping command signal when at least one of said first and second output signals changes to said trip state.

The safety circuit advantageously provides for a redundant temperature tripping circuit which may be more reliable and robust to certain faults and weaknesses which may characterise other redundant temperature tripping circuits.

In an embodiment the safety circuit relying on two different signals derived from the same temperature is very robust to common-mode noise, which may for example be generated by a frequency converter, and is typically more robust to common-mode noise than prior art configurations using one temperature-derived signal to feed both evaluation modules.

In an embodiment the safety circuit provides complete redundancy for all key components of both evaluation modules for individual faults as well as component type faults, as the modules are different because of the different input signals. In prior art configurations with a common input to both modules, identical components failing or decaying uniformly in the two modules may prevent detection of error conditions.

In an embodiment the safety circuit may evaluate better than many prior art configurations to security standards or regulations, and score more robust in failure mode and effects analysis.

In an embodiment the safety circuit advantageously compensates for DC bias faults related to decoupling capacitors and filtering capacitors as the two-different-input design in preferred embodiments allows for decoupling two input signals with different DC potentials, preferably balanced around a mean DC potential, to both supply and ground.

In an embodiment the safety circuit may provide for a tripping command signal not only when a certain temperature state is reached, but also if the temperature dependent element is broken to cause a short circuit or an open circuit. This is advantageous to prior art configurations which typically only detects open circuit failures.

In an embodiment the safety circuit is advantageous by limiting or reducing any fault currents caused by erroneous electrical connection between the temperature dependent element and any adjacent electrical circuits, e.g. a phase-carrying wire of a motor, motor windings, etc.

In an embodiment the safety circuit is advantageously implemented without using microcontrollers or the like, thereby reducing complexity and costs while still providing a safety circuit with increased safety and reliability compared to many prior art configurations.

An advantageous embodiment is obtained when said first input and said second input are connected to different terminals of said temperature-dependent element.

In order to establish different first and second input signals, these signals may preferably be provided by two different terminals of the temperature-dependent element. The temperature-dependent element may preferably be a component with a well-defined relation between temperature and a component parameter such as e.g. impedance, e.g. DC-resistance, voltage or current. Preferably it has at least two terminals so as to provide at least two different input signals to the temperature evaluation modules.

An advantageous embodiment is obtained when said temperature-dependent element comprises a thermistor, e.g. a PTC thermistor, or a circuit of thermistors, e.g. two or more PTC thermistors, coupled in series.

A resistor where the resistance varies significantly with varying temperature may advantageously be used for temperature-dependent element, e.g. a thermistor with positive temperature coefficient PTC or negative temperature coefficient NTC.

An advantageous embodiment is obtained when said temperature-dependent element comprises two terminals, and by series-coupling between two resistors forms a voltage divider with two taps for providing said different first and second input signals.

Besides being a cheap and effective way of deriving two different input signals from the same temperature, the three-resistor voltage divider consisting preferably of a resistor, the thermistor and another resistor in series also perform more robustly with respect to electromagnetic interference (EMI) than a two-resistor voltage divider where the thermistor is connected directly to, e.g., ground potential.

Moreover, by having the thermistor connected through resistors to both supply and ground, as contrary to conventional PTC thermistor voltage divider designs, an effective high current protection or reduction is achieved. If a conducting part of the thermistor, which may for example be mounted on high-current-carrying motor windings for monitoring their temperature, is by accident shorted with such high current wire, the current gets no direct connection to e.g. ground, but will have to run through the resistor of the voltage divider. While the resistor in some applications will break thereby, it still serves the purpose of protecting other, possibly more expensive, parts of the setup.

Other types of impedances may be used in an embodiment in addition to or instead of the resistors. In an embodiment another number of resistors, or another configuration of resistors, are arranged to derive at least two different signals from the same temperature.

An advantageous embodiment is obtained when said first temperature evaluation module is arranged to perform said determining said first temperature state based on a first reference value, and said second temperature evaluation module is arranged to perform said determining said second temperature state based on a second reference value different from said first reference value.

As the first and second input signals are different, the first and second evaluation modules may advantageously be implemented in such a way, that different first and second reference values are used to evaluate the input signals. The use of two different reference values further improves the robustness and reliability of the safety circuit by minimizing the overlap and correlation between the two evaluation modules and increasing the probability that any error condition is detected by at least one of the two evaluation modules.

An advantageous embodiment is obtained when said first and second temperature evaluation modules comprise different reference sources to establish said different first and second reference values, respectively.

Providing individual reference sources for each of the evaluation modules is an advantageous way of establishing the two different reference values and further minimize the number of common components between the two evaluation modules.

An advantageous embodiment is obtained when said first and second temperature evaluation modules comprise individual reference inputs to receive said different first and second reference values, respectively.

Providing individual reference inputs for each of the evaluation modules is an advantageous way of receiving the two different reference values from external sources and further minimize the correlation between the two evaluation modules.

An advantageous embodiment is obtained when at least one, and preferably both, of said first and second temperature evaluation modules are based on comparator technology.

Contrary to known systems where the same input signal is evaluated by two evaluation modules which are either equal or fundamentally different in evaluation technology, and use a common reference value to compare with, the present invention which provides two different input signals, may use similar cost-efficient comparator technology for both evaluation modules while still introducing significant differences in key elements such as reference values, signal ranges, focus on rising or falling voltage, etc.

Comparator technology may refer to various ways of comparing a test signal with a reference signal. For example the comparator technology may be implemented by discrete components e.g. comprising transistors and support circuitry, or, preferably, by integrated comparator circuits comprising one or more comparators in each package.

An advantageous embodiment is obtained when said first and second temperature evaluation modules are different.

As the first and second input signals are different, the temperature evaluation modules should also be different, at least with respect to evaluation of the input signal. A difference between the temperature evaluation modules may in an embodiment comprise that at least one of the electronic components in the first temperature evaluation module is not found in the second temperature evaluation module with the same nominal value. In another embodiment the difference may comprise that the construction is inverted with respect to for example the power supply, the input, a comparator, etc., for example to achieve a basically opposite evaluation of the second input compared to the first input. In another embodiment the difference may comprise the use of a different reference value to which the input signal or an intermediate signal is compared with. By designing the safety circuit in such a way that the two temperature evaluation modules have to be different, the inventors have also achieved another safety-related advantage, as the differences in the modules reduce the risk that a common fault or weakness causes both modules to fail simultaneously, and thereby eliminates the required redundancy.

An advantageous embodiment is obtained when said first and second temperature evaluation modules are based on different technologies, e.g. comparator technology and microcontroller technology.

By implementing the two evaluation modules with different technologies, e.g. comparator technology, microcontroller technology, etc., further robustness and reliability is obtained, as the two evaluation modules will then have different vulnerabilities and strengths to ensure that any error condition is detected by at least one of the evaluation modules.

An advantageous embodiment is obtained when said temperature-dependent element is located in a load, such as a motor, and said temperature is a temperature within said load.

The safety circuit is particularly advantageous for detecting critical temperature error conditions in loads, in particular electrical loads, e.g. a motor, e.g. implemented as part of a compressor or generator. The temperature-dependent element may for example be installed adjacent to motor windings or other parts that get hot in response to a fault, misuse or overload.

An advantageous embodiment is obtained when said tripping monitoring unit is arranged to establish said tripping command signal by forcing a trip signal output with a voltage level denoting "high" to change to a voltage level denoting "low", e.g. less than 1 VDC.

By having the tripping command signal defined as a "low" or a low voltage on the trip signal output, and thereby maintaining a "high" when none of the temperature evaluation modules are in the trip state, a particularly advantageous setup as regards safety is achieved. Error conditions in addition to the temperature error conditions tested by the present safety circuit, will most often lead to loss of signal or loss of power, and thereby lead to a "low" on the trip signal output and/or on the input of the subsequent relay, electronic switch or other control device operating in response to the tripping command signal. Thereby most error conditions in the safety circuit itself, for example power loss, broken wires, etc. will prevent the trip signal from attaining the normal status of "high", and will thereby prevent operation of the motor, compressor, etc., with a malfunctioning temperature safety circuit.

In another embodiment the tripping monitoring unit is arranged to let the tripping command signal go "high" when any of the temperature evaluation modules changes to the trip state. Such embodiment preferably comprises means for monitoring that the safety circuit is powered and properly connected.

An advantageous embodiment is obtained when the safety circuit comprises or is communicatively coupled to an electrically operated switch, such as a relay, controlled in response to said tripping command signal.

The electrically operated switch may preferably be a main switch or emergency switch to remove power from the entire setup, or a dedicated switch for specifically disconnecting just the concerned load, e.g. motor. The electrically operated switch may also be a system of switch or a switch operating another electrically operated switch, e.g. a relay.

An advantageous embodiment is obtained when said electrically operated switch is arranged in a "normally-open (NO)" configuration.

It is advantageous to arrange the electrically operated switch, e.g. relay, so that the circuit is open unless a "high" is received from the tripping monitoring unit. Thereby the switch will disconnect power to the load if the safety circuit loses its power supply, the connection to the tripping monitoring unit is lost, or other circuit-related faults happen.

An advantageous embodiment is obtained when said temperature-dependent element is located in an electrically powered load such as a motor, and wherein said electrically operated switch is arranged to disconnect said electrically powered load in response to said tripping command signal.

An advantageous embodiment is obtained when the safety circuit comprises two or more first and second inputs arranged to receive two or more first and second input signals, respectively, derived from two or more respective temperatures by means of two or more respective temperature-dependent elements so that each pair of a first and second input signal relates to the same of said two or more temperatures and is connected to different terminals of the same of said two or more temperature-dependent elements; the first and second input signal of each pair being different.

In complex systems, such as three-phase powered loads, or loads where temperature has to be monitored in several locations, the safety circuit may beneficially support arranging two or more temperature-dependent elements at the load without adding more safety circuits. Advantageously, several temperature-dependent elements may be connected to the first and second evaluation modules. The evaluation modules may comprises several first inputs and several second inputs for this purpose, or may be configured for having more temperature-dependent elements connected in parallel to a single first input and a single second input.

An advantageous embodiment is obtained when said first temperature evaluation module is arranged to receive and evaluate said two or more first input signals and determine said first temperature state as said trip state when at least one of said two or more first input signals evaluates to said trip state; and wherein said second temperature evaluation module is arranged to receive and evaluate said two or more second input signals and determine said second temperature state as said trip state when at least one of said two or more second input signals evaluates to said trip state.

In a system with two or more temperature-dependent elements, it is advantageous to configure the evaluation modules to signal a trip state as soon as any one of the temperature-dependent elements exceeds the temperature threshold. Hence, in a preferred embodiment, the tripping monitoring unit activates the tripping command signal even if just a single temperature-dependent element is considered too hot by even just one of the at least two evaluation modules.

An advantageous embodiment is obtained when said temperature-dependent element is located in an electrically powered, three-phase load, such as a motor, and wherein said electrically operated switch is arranged to disconnect one or more of said phases, preferably all three phases, in response to said tripping command signal.

An advantageous embodiment is obtained when said temperature-dependent element is associated with a sub-load of an electrically powered, three-phase load, such as a motor, comprising three sub-loads each having an associated temperature-dependent element, and wherein said first and second evaluation modules comprises three first and second inputs connected to each of said three temperature-dependent elements.

Such a system may e.g. be a motor or other load arranged with each phase powering an individual sub-load, and thereby having three sub-loads that can fail individually and therefore needs individual temperature monitoring. By the present embodiment, such a system may be monitored by three temperature-dependent elements and one safety circuit comprising two evaluation modules, both receiving input signals from each temperature-dependent element.

An advantageous embodiment is obtained when said safety circuit comprises said temperature-dependent element.

In various embodiments the temperature-dependent element(s) may be integrated with the safety circuit, which is then preferably arranged to be located at the temperature monitoring location, or the temperature-dependent element(s) may be arranged at wires extending from the rest of the safety circuit arrangement for easier installation at a load with limited space available. In another embodiment, the safety circuit simply comprises input terminals to which temperature-dependent elements can be connected, e.g. for utilising pre-installed temperature-dependent elements, e.g. pre-installed among the windings of motors, etc.

The invention further relates to a safety circuit operation method for temperature tripping with redundancy, the safety circuit operation method comprising the steps of: providing a first input signal derived from a temperature by means of a temperature-dependent element; processing the first input signal by a first temperature evaluation module, the processing comprising determining a first temperature state as one of at least two states, whereof at least one state is a trip state, and providing a first output signal corresponding to said determined first temperature state; providing a second input signal derived from said temperature by means of said temperature-dependent element, the second input signal being different from said first input signal; processing the second input signal by a second temperature evaluation module, the processing comprising determining a second temperature state as one of at least two states, whereof at least one state is a trip state, and providing a second output signal corresponding to said determined second temperature state; establishing a tripping command signal when at least one of said first and second output signals changes to said trip state.

The safety circuit operation method advantageously provides for redundant temperature tripping which may be more reliable and robust to certain faults and weaknesses which may characterise other redundant temperature tripping methods.

In an embodiment the safety circuit operation method relying on two different signals derived from the same temperature is very robust to common-mode noise, which may for example be generated by a frequency converter, and is typically more robust to common-mode noise than prior art methods using one temperature-derived signal to feed both evaluation modules.

In an embodiment the safety circuit operation method provides complete redundancy for all key components of both evaluation modules for individual faults as well as component type faults, as the modules are different because of the different input signals. In prior art methods with a common input to both modules, identical components failing or decaying uniformly in the two modules may prevent detection of error conditions.

In an embodiment the safety circuit operation method may evaluate better than many prior art methods to security standards or regulations, and score more robust in failure mode and effects analysis.

In an embodiment the safety circuit operation method advantageously compensates for DC bias faults related to decoupling capacitors and filtering capacitors as the two-different-input design in preferred embodiments allows for decoupling two input signals with different DC potentials, preferably balanced around a mean DC potential, to both supply and ground.

In an embodiment the safety circuit operation method may provide for a tripping command signal not only when a certain temperature state is reached, but also if the temperature dependent element is broken to cause a short circuit or an open circuit. This is advantageous to prior art methods which typically only detects open circuit failures.

In an embodiment the safety circuit operation method is advantageous by limiting or reducing any fault currents caused by erroneous electrical connection between the temperature dependent element and any adjacent electrical circuits, e.g. a phase-carrying wire of a motor, motor windings, etc.

In an embodiment the safety circuit operation method is advantageously implemented without using micro controllers or the like, thereby reducing complexity and costs while still providing a safety circuit operation method with increased safety and reliability compared to many prior art methods.

An advantageous embodiment is obtained when said first input signal and said second input signal are connected to different terminals of said temperature-dependent element.

In order to establish different first and second input signals, these signals may preferably be provided by two different terminals of the temperature-dependent element. The temperature-dependent element may preferably be a component with a well-defined relation between temperature and a component parameter such as e.g. impedance, e.g. DC-resistance, voltage or current. Preferably it has at least two terminals so as to provide at least two different input signals to the temperature evaluation modules.

An advantageous embodiment is obtained when said temperature-dependent element comprises a thermistor, e.g. a PTC thermistor, or a circuit of thermistors, e.g. two or more PTC thermistors, coupled in series.

A resistor where the resistance varies significantly with varying temperature may advantageously be used for temperature-dependent element, e.g. a thermistor with positive temperature coefficient PTC or negative temperature coefficient NTC.

An advantageous embodiment is obtained when said temperature-dependent element comprises two terminals, and by series-coupling between two resistors forms a voltage divider with two taps for said providing said different first and second input signals.

Besides being a cheap and effective way of deriving two different input signals from the same temperature, the three-resistor voltage divider consisting preferably of a resistor, the thermistor and another resistor in series also perform more robustly with respect to electromagnetic interference (EMI) than a two-resistor voltage divider where the thermistor is connected directly to, e.g., ground potential.

Moreover, by having the thermistor connected through resistors to both supply and ground, as contrary to conventional PTC thermistor voltage divider designs, an effective high current protection or reduction is achieved. If a conducting part of the thermistor, which may for example be mounted on high-current-carrying motor windings for monitoring their temperature, is by accident shorted with such high current wire, the current gets no direct connection to e.g. ground, but will have to run through the resistor of the voltage divider. While the resistor in some applications will break thereby, it still serves the purpose of protecting other, possibly more expensive, parts of the setup.

Other types of impedances may be used in an embodiment in addition to or instead of the resistors. In an embodiment another number of resistors, or another configuration of resistors, are arranged to derive at least two different signals from the same temperature.

An advantageous embodiment is obtained when said processing by said first temperature evaluation module uses a first reference value to determine said first temperature state, and said processing by said second temperature evaluation module uses a second reference value different from said first reference value to determine said second temperature state.

As the first and second input signals are different, the processing in each of the first and second evaluation modules may advantageously use different first and second reference values to evaluate the input signals. The use of two different reference values further improves the robustness and reliability of the safety circuit operation method by minimizing the overlap and correlation between the processing in the two evaluation modules and increasing the probability that any error condition is detected by at least one of the two evaluation modules.

An advantageous embodiment is obtained when said different first and second reference values are provided to said first and second temperature evaluation modules from different reference sources.

Using individual reference sources for the two reference values is an advantageous way of establishing the two different reference values and further minimize the number of common components between the two evaluation modules. The two reference sources may be provided by implementing a reference source in each evaluation module or by having two reference sources from which to provide reference values to the evaluation modules.

An advantageous embodiment is obtained when at least one, and preferably both, of said first and second temperature evaluation modules are based on comparator technology.

Contrary to known systems where the same input signal is evaluated by two evaluation modules which are either equal or fundamentally different in evaluation technology, and use a common reference value to compare with, the present invention which provides two different input signals, may use similar cost-efficient comparator technology for both evaluation modules while still introducing significant differences in key elements such as reference values, signal ranges, focus on rising or falling voltage, etc.

Comparator technology may refer to various ways of comparing a test signal with a reference signal. For example the comparator technology may be implemented by discrete components e.g. comprising transistors and support circuitry, or, preferably, by integrated comparator circuits comprising one or more comparators in each package.

An advantageous embodiment is obtained when said first and second temperature evaluation modules are different.

As the first and second input signals are different, the temperature evaluation modules should also be different, at least with respect to evaluation of the input signal. A difference between the temperature evaluation modules may in an embodiment comprise that at least one of the electronic components in the first temperature evaluation module is not found in the second temperature evaluation module with the same nominal value. In another embodiment the difference may comprise that the construction is inverted with respect to for example the power supply, the input, a comparator, etc., for example to achieve a basically opposite evaluation of the second input compared to the first input. In another embodiment the difference may comprise the use of a different reference value to which the input signal or an intermediate signal is compared with. By designing the safety circuit in such a way that the two temperature evaluation modules have to be different, the inventors have also achieved another safety-related advantage, as the differences in the modules reduce the risk that a common fault or weakness causes both modules to fail simultaneously, and thereby eliminates the required redundancy.

An advantageous embodiment is obtained when said first and second temperature evaluation modules are based on different technologies, e.g. comparator technology and microcontroller technology.

By implementing the two evaluation modules with different technologies, e.g. comparator technology, microcontroller technology, etc., further robustness and reliability is obtained, as the two evaluation modules will then have different vulnerabilities and strengths to ensure that any error condition is detected by at least one of the evaluation modules.

An advantageous embodiment is obtained when said temperature-dependent element is located in a load, such as a motor, and said temperature is a temperature within said load.

The safety circuit operation method is particularly advantageous for detecting critical temperature error conditions in loads, in particular electrical loads, e.g. a motor, e.g. implemented as part of a compressor or generator. The temperature-dependent element may for example be installed adjacent to motor windings or other parts that get hot in response to a fault, misuse or overload.

An advantageous embodiment is obtained when said step of establishing said tripping command signal comprises forcing a trip signal output with a voltage level denoting "high" to change to a voltage level denoting "low", e.g. less than 1 VDC.

By having the tripping command signal defined as a "low" or a low voltage on the trip signal output, and thereby maintaining a "high" when none of the temperature evaluation modules are in the trip state, a particularly advantageous setup as regards safety is achieved. Error conditions in addition to the temperature error conditions tested by the present safety circuit, will most often lead to loss of signal or loss of power, and thereby lead to a "low" on the trip signal output and/or on the input of the subsequent relay, electronic switch or other control device operating in response to the tripping command signal. Thereby most error conditions in the safety circuit itself, for example power loss, broken wires, etc. will prevent the trip signal from attaining the normal status of "high", and will thereby prevent operation of the motor, compressor, etc., with a malfunctioning temperature safety circuit.

In another embodiment the tripping monitoring unit is arranged to let the tripping command signal go "high" when any of the temperature evaluation modules changes to the trip state. Such embodiment preferably comprises means for monitoring that the safety circuit is powered and properly connected.

An advantageous embodiment is obtained when the method further comprises a step of operating an electrically operated switch, such as a relay, on the basis of said tripping command signal.

The electrically operated switch may preferably be a main switch or emergency switch to remove power from the entire setup, or a dedicated switch for specifically disconnecting just the concerned load, e.g. motor. The electrically operated switch may also be a system of switch or a switch operating another electrically operated switch, e.g. a relay.

An advantageous embodiment is obtained when said electrically operated switch is arranged in a "normally-open (NO)" configuration.

It is advantageous to arrange the electrically operated switch, e.g. relay, so that the circuit is open unless a "high" is received from the tripping monitoring unit. Thereby the switch will disconnect power to the load if the safety circuit loses its power supply, the connection to the tripping monitoring unit is lost, or other circuit-related faults happen.

An advantageous embodiment is obtained when said temperature-dependent element is located in an electrically powered load, such as a motor, and wherein said method comprises a step of disconnecting said electrically powered load in response to said tripping command signal by means of said electrically operated switch.

An advantageous embodiment is obtained when the method further comprises providing two or more first and second input signals derived from two or more respective temperatures by means of two or more respective temperature-dependent elements so that each pair of a first and second input signal relates to the same of said two or more temperatures and is connected to different terminals of the same of said two or more temperature-dependent elements; the first and second input signal of each pair being different.

In complex systems, such as three-phase powered loads, or loads where temperature has to be monitored in several locations, the safety circuit operation method may beneficially support arranging two or more temperature-dependent elements at the load without adding more safety circuits. Advantageously, several temperature-dependent elements may be connected to the first and second evaluation modules. The evaluation modules may comprises several first inputs and several second inputs for this purpose, or may be configured for having more temperature-dependent elements connected in parallel to a single first input and a single second input.

An advantageous embodiment is obtained when the method comprises processing said two or more first input signals by said first temperature evaluation module, the processing comprises determining said first temperature state as said trip state when at least one of said two or more first input signals evaluates to said trip state; and processing said two or more second input signals by said second temperature evaluation module, the processing comprises determining said second temperature state as said trip state when at least one of said two or more second input signals evaluates to said trip state.

When applying the safety circuit operation method to a system with two or more temperature-dependent elements, it is advantageous to configure the evaluation modules to signal a trip state as soon as any one of the temperature-dependent elements exceeds the temperature threshold. Hence, in a preferred embodiment, the tripping monitoring unit activates the tripping command signal even if just a single temperature-dependent element is considered too hot by even just one of the at least two evaluation modules.

An advantageous embodiment is obtained when said temperature-dependent element is located in an electrically powered, three-phase load, such as a motor, and wherein said method comprises a step of disconnecting one or more of said phases, preferably all three phases in response to said tripping command signal by means of said electrically operated switch.

An advantageous embodiment is obtained when said temperature-dependent element is associated with a sub-load of an electrically powered, three-phase load, such as a motor, comprising three sub-loads each having an associated temperature-dependent element, and wherein the method comprises deriving said first and second input signal from each of said three temperature-dependent elements.

Such a system may e.g. be a motor or other load arranged with each phase powering an individual sub-load, and thereby having three sub-loads that can fail individually and therefore needs individual temperature monitoring. By the present embodiment, such a system may be monitored by three temperature-dependent elements and one safety circuit comprising two evaluation modules, both receiving input signals from each temperature-dependent element.

The present invention further relates to an electrically powered motor comprising a safety circuit for temperature tripping with redundancy according to any of the above and at least one temperature-dependent element of which one terminal is connected to said first input of said safety circuit and another terminal is connected to said second input of said safety circuit.

An advantageous embodiment is obtained when the electrically powered motor comprises an electrically operated switch arranged to disconnect said motor from one or more supply phases, preferably all supply phases, in response to said tripping command signal of said safety circuit.

THE DRAWINGS

The invention will in the following be described with reference to the drawings where.

DETAILED DESCRIPTION

Figure 1:
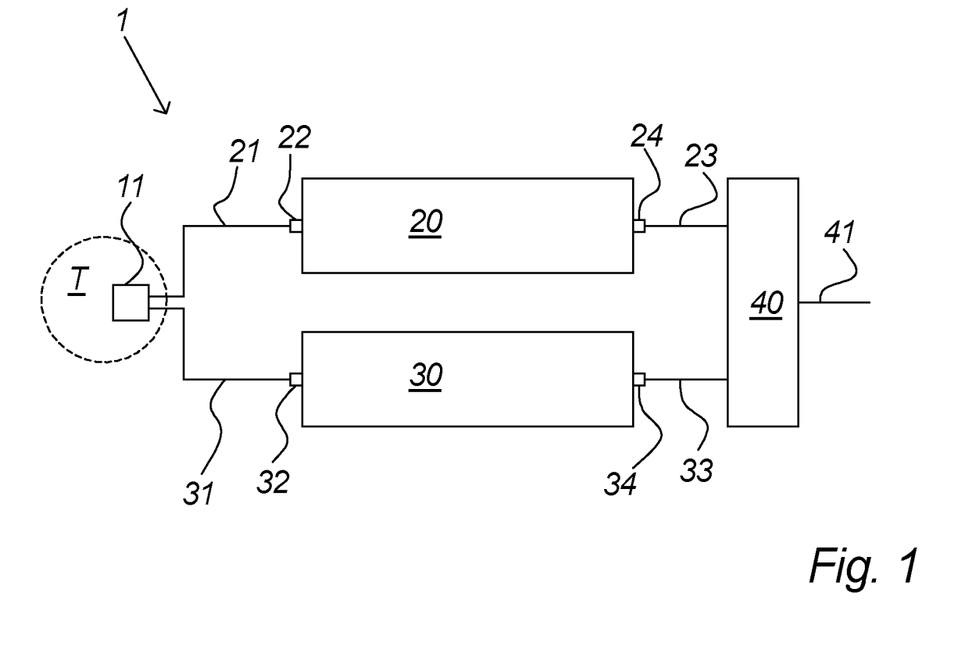
FIG. 1 illustrates an embodiment of a safety circuit according to the invention.

FIG. 1 illustrates an embodiment of a safety circuit 1 according to the invention. The safety circuit embodiment comprises a first temperature evaluation module 20 and a second temperature evaluation module 30. Each temperature evaluation module has an input 22, 32, and an output 24, 34. On the inputs 22, 32 are received a first and second input signal 21, 31, respectively. The two input signals 21, 31 are different, but originate from the same temperature-dependent element 11, which is subjected to and influenced by a temperature T, e.g. the temperature inside a load performing a work. The input signals may preferably be analog signals varying positively or negatively with increasing temperature, with or without linear relationship, but may alternatively be quantized in two or more levels, e.g. by an A/D converter or a digital-output temperature-dependent element. The difference between the two input signals may be ensured by basically establishing the signals with different relationships to temperature or temperature variation, or be caused by different signal coding. Further embodiments of the temperature-dependent elements which may be used in the embodiment of FIG. 1 are provided below.

Each temperature evaluation module 20, 30 determines a temperature state based on their respective input signals 21, 31. The temperature states may for example comprise states representing "too hot" and "acceptable".

Because the two input signals are different, the redundant temperature evaluation modules are not just simple copies of each other, but must correspondingly differ from each other in some way. The differences between the evaluation modules may be introduced by different reference values, different evaluation techniques, mirrored circuits, different component values, filters, gains, etc. In any way, each difference typically improves the reliability of the safety circuit, as it reduces the risk that the same sub-system fails simultaneously in both evaluation modules. Moreover, the use of two different input signals makes the safety circuit less susceptible to noise-induced errors, as noise introduced from environment, e.g. from a switch-mode frequency control, to the sometimes relatively long wires to the temperature-dependent element, may interfere differently with the two different input signals. In other words, the redundancy effect of the safety circuit of embodiments of the invention are more robust than in systems that just use a copy of the a circuit to provide redundancy.

The evaluation of an input signal to establish a temperature state may by any of several common ways, for example comparing the signal value with a reference threshold value, with or without hysteresis mechanisms, monitoring the input signal value development and analysing for peaks, trends, steep slopes, etc. Further embodiments of the temperature evaluation modules which may be used in the embodiment of FIG. 1 are provided below.

The determined temperature states are output respectively via the first and second outputs 24, 34, as output signals 23, 33. For example, an output signal having a value of "high" or "5V" or the like may represent one of the possible states, e.g. "acceptable", and a signal value of "low" or "0V" or the like may represent one other of the possible states, e.g. "too hot". Other possible signal coding, analog or digital, are known by the person skilled in the art. It is advantageous to map the most critical state, in this example "too hot", to the most passive signal coding, in this example "low" or "0V", as most kinds of internal failures in the evaluation module, e.g. power supply loss, etc., will thereby make the output default to the critical state definition, and thereby signal an error.

The safety circuit 1 further comprises a tripping monitoring unit 40, which receives the two output signals 23, 33, and determines whether or not to establish a tripping command signal 41. In a preferred embodiment, if at least one of the two output signals 23, 33 indicates the temperature state "too hot", the tripping monitoring unit establishes the tripping command signal 41 to indicate an alarm. By tripping upon just one of the evaluation modules indicating alarm, the safety circuit may fulfil various requirements for redundant safety circuits by being able to signal alarm even if one of the evaluation modules fails.

Preferably, the tripping command signal is received by a tripping circuit, relay, controller or other unit which is arranged to switch off an overheated load in response to receiving the tripping command signal 41. As with the output signals 23, 33, also the tripping monitoring unit is preferably designed so that the most passive output is defined as the tripping command signal, so that a failure which makes the tripping monitoring unit fall back to its default, e.g. non-powered, state, will make its output be recognised as an error or alarm. Further embodiments of the tripping monitoring unit and tripping command signal which may be used in the embodiment of FIG. 1 are provided below.

Figure 2:
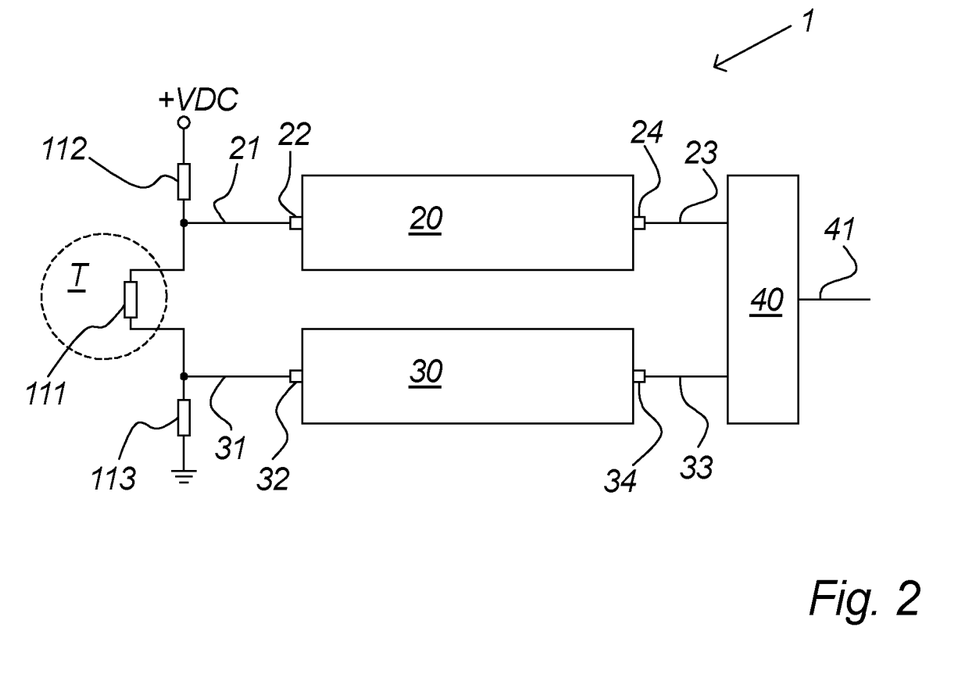
FIG. 2 illustrates another embodiment of a safety circuit with voltage divider.

FIG. 2 illustrates an embodiment of a safety circuit according to the invention. The embodiment comprises the same elements as described above with reference to FIG. 1, but discloses a specific example of an advantageous temperature-dependent element which can establish the two different input signals 21, 31 in dependency of the same temperature T.

The input signals 21, 31 are tapped from a voltage divider consisting of a first resistor 112, a thermistor 111, and a second resistor 113. In the example of FIG. 2, the series of the resistor-thermistor-resistor is coupled between a positive DC voltage and ground, thereby forming a voltage divider with two taps both having a varying potential in dependency of the temperature-dependent resistance of the thermistor 111. In a preferred embodiment a PTC thermistor is utilised, meaning that the resistance increases steeply when the temperature exceeds a pre-defined temperature. Thereby, the voltage of first input signal 21 tapped above the PTC thermistor 111 will increase with increasing temperature T and approach an upper limit corresponding to the +VDC potential. On the contrary, the voltage of the second input signal 31 tapped below the PTC thermistor will decrease with increasing temperature T and approach a lower limit corresponding to the ground potential. By implementing the safety circuit such that one evaluation module triggers on rising voltage, whereas the other evaluation module triggers on falling voltage, the robustness and redundancy effect is further improved.

The person of ordinary skill in the art will appreciate that similar voltage dividers may be established on the basis of other resistive temperature-dependent elements, e.g. NTC thermistors, though typically without resistance jump at a specific temperature, or that a series of several temperature-dependent resistive elements or a mix of temperature-dependent and other resistive elements are used for thermistor 111, or that the first and/or second resistor 112, 113 are substituted by other circuit elements. In other embodiments the first and second input signals may conduct temperature-dependent current instead of temperature-dependent voltage, etc.

In a preferred embodiment the first and second resistors 112, 113 are located together with the evaluation modules 20, 30, as an integrated part of their circuitry, typically on a common printed circuit board, and wires are drawn from the inputs of the evaluation modules to the thermistor 111, which is preferably located within or on an object to be protected against too high temperature, e.g. windings of an electrical motor.

In a specific embodiment the first and second resistors 112, 113 may each have a resistance of 1 kΩ, and the thermistor 111 may be a PTC thermistor with a resistance characteristic according to DIN 44081. With an exemplary +VDC of 5 V, when the temperature is more than 5° C. below the thermistor's nominal response temperature, i.e. below $\vartheta_{NAT}-5°$ C., the first input signal 21 may for example comprise a potential of approximately 2.5 V, and the second input signal 31 approximately 2.5 V. When the temperature exceeds for example $\vartheta_{NAT}+5°$ C., the first input signal 21 may increase to at least above 3.5 V and approach the +VDC of 5 V, whereas the second input signal 31 may decrease to below 1.5 V and approach 0V. It is noted that the first and second resistor may have different resistance values in certain embodiments.

In another exemplary embodiment two or more PTC thermistors are coupled in series between the first and second resistors 112, 113. Because of the characteristic steep increase of resistance at the sense temperature of the thermistors, the accumulated resistance of the multiple PTC thermistors below the sense temperature may still be significantly less than the accumulated resistance as soon as just one PTC thermistor exceeds its sense temperature. This behaviour makes it possible to simply add PTC thermistors in the series as long as they are mounted between the tapping points for the first and second input signal, and thereby in a simple way provide temperature tripping functionality in different locations with a single safety circuit.

The safety circuit may also react on broken thermistors or other circuit faults related to the temperature-dependent element. In an embodiment, e.g. the voltage divider embodiment of FIG. 2, a thermistor or wire that is broken in such a way that the circuit is open, will be experienced by the safety circuit in the same way as an infinite resistance, i.e.

a very high temperature, and the safety circuit will establish the trip command signal 41. In an embodiment, e.g. the voltage divider embodiment of FIG. 2, a thermistor or wire that is broken in such a way that it shorts the circuit, i.e. effectively connects the two tapping points directly, will lead to equal potential on the first and second input signals 21, 31, which may be detected, e.g. as being too low or too high, respectively, or by testing the two input signals for equivalency.

Moreover, by having the thermistor connected through resistors 112 to supply and through resistor 113 to ground an effective high current protection or reduction is achieved. If a conducting part of the thermistor, which may for example be mounted on high-current-carrying motor windings for monitoring their temperature, is by accident shorted with such high current wire, the current from the motor power supply gets no direct connection to e.g. ground, but will have to run through e.g. resistor 113 of the voltage divider. While the resistor 113 in some embodiments will break thereby, it still serves the purpose of protecting other, possibly more expensive, parts of the setup.

Furthermore, in a preferred embodiment, the two different input signals 21, 31 both have capacitive decoupling to both supply and ground, thereby compensating for DC bias faults in decoupling or filtering capacitors, as the two different input signals in a preferred embodiment have different DC potentials, preferably balanced around a mean DC potential.

Figure 3:
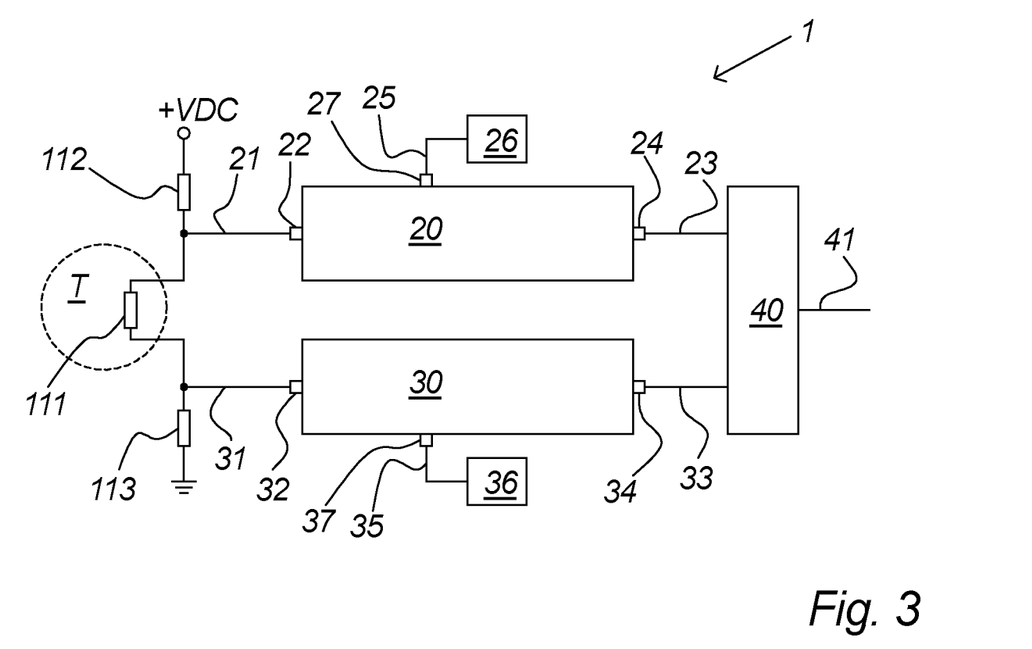
FIG. 3 illustrates another embodiment of a safety circuit with reference sources.

FIG. 3 illustrates an embodiment of a safety circuit according to the invention. The components are as described above with reference to FIGS. 1 and 2, but the embodiment in FIG. 3 further comprises a first and second reference value 25, 35 provided for each of the temperature evaluation modules 20, 30, respectively, via first and second reference inputs 27, 37. The reference values 25, 35 are illustrated as derived individually from a first and second reference source 26, 36. The reference values may in a preferred embodiment comprise voltages comparable to the voltages received at the first and second input 21, 31, respectively, when the temperature exceeds a pre-defined limit. Hence, the reference values should preferably be usable for comparison with the input signals in order to determine said temperature state. In an example where the temperature-dependent element is formed by two equal resistors and a PTC thermistor as described as one example above with reference to FIG. 2, the first reference value 25 should preferably be higher than the second reference value 35. In an embodiment the input signals and/or the reference values undergo a processing, filtering, gain, or other transformation before they are compared or otherwise applied to each other, whereby the reference values should reflect this and not necessarily approximate the voltage from the voltage divider at the sense temperature.

In various embodiments the reference sources 26, 36 may be implemented as part of the evaluation modules 20, 30 or as external sources. The reference sources may e.g. be implemented as voltage dividers, voltage regulators, voltage references, etc. Where the temperature-dependent element establishes input signals with other indication of temperature by other characteristics than analog voltage, e.g. by varying current or quantized or digital signals, the reference values should preferably be of similar type.

Figure 4:
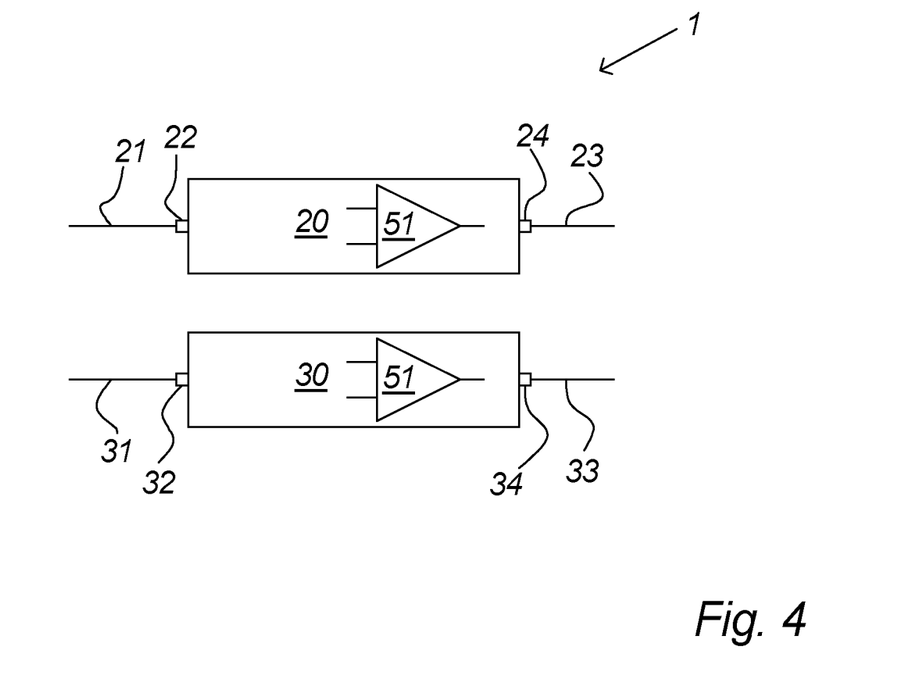
FIG. 4 illustrates a part of an embodiment of a safety circuit with comparator technology.

FIG. 4 illustrates a part of an embodiment of a safety circuit, e.g. as described above with reference to FIGS. 1-3, where the first evaluation module 20 and the second evaluation module 30 are both based on comparator technology and comprises a comparator 51 for comparing the input signal and the reference value, or representatives thereof, to determine a temperature state. In an embodiment the comparators 51 may be designed with discrete components such as e.g. transistors and support circuitry as known by the person skilled in the art of comparator technology. In an embodiment the comparators 51 are preferably integrated comparator circuits, with one or more comparators in each package. In an embodiment, the comparators 51 of each of the evaluation modules may be part of a multi-comparator package shared between the two evaluation modules.

Figure 5:
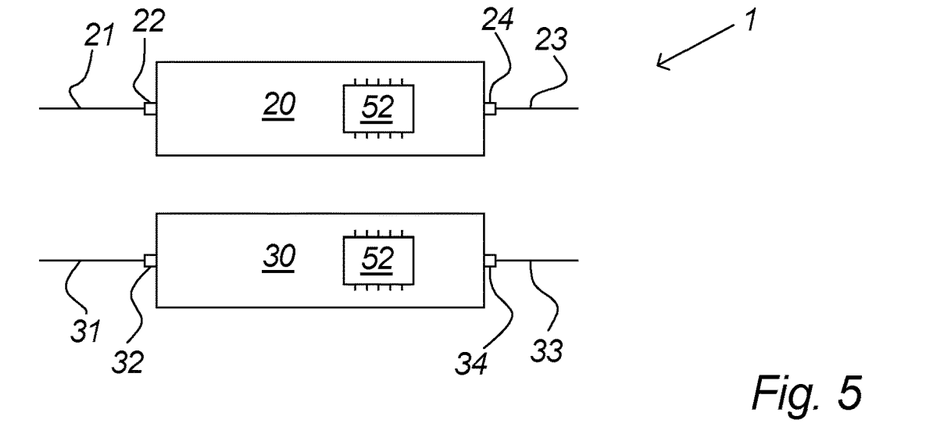
FIG. 5 illustrates a part of an embodiment of a safety circuit with microcontroller technology.

FIG. 5 illustrates a part of an embodiment of a safety circuit, e.g. as described above with reference to FIGS. 1-3, where the first evaluation module 20 and the second evaluation module 30 are both based on microcontroller technology and comprises a microcontroller 52 for evaluating the input signal and the reference value, or representatives thereof, to determine a temperature state. The reference value may in an embodiment be predefined or established within the microcontroller itself. By the term microcontroller is referred to any type and scale of microcontroller, DSP, programmable gate array, CPU, etc., but preferably a small and simple microcontroller is used. In an embodiment a microcontroller is shared between the two evaluation modules and/or external modules with processing tasks. In an embodiment each evaluation module is equipped with an individual microcontroller to ensure complete redundancy.

Figure 6:
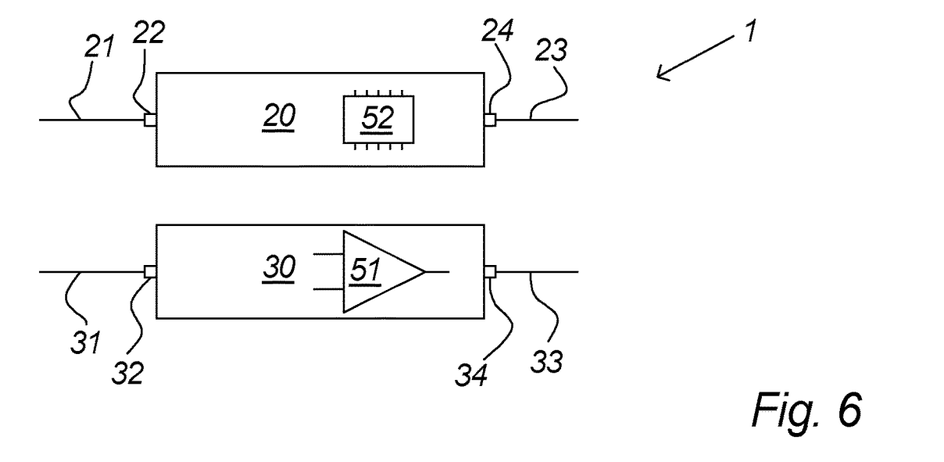
FIG. 6 illustrates a part of an embodiment of a safety circuit with comparator technology and microcontroller technology.

FIG. 6 illustrates a part of an embodiment of a safety circuit, e.g. as described above with reference to FIGS. 1-3, where the first evaluation module 20 and the second evaluation module 30 are based on different technologies, e.g. one evaluation module based on comparator technology 51 for example as described in further detail above with reference to FIG. 4, and one evaluation module based on microcontroller technology 52 for example as described in further detail above with reference to FIG. 5.

Figure 7:
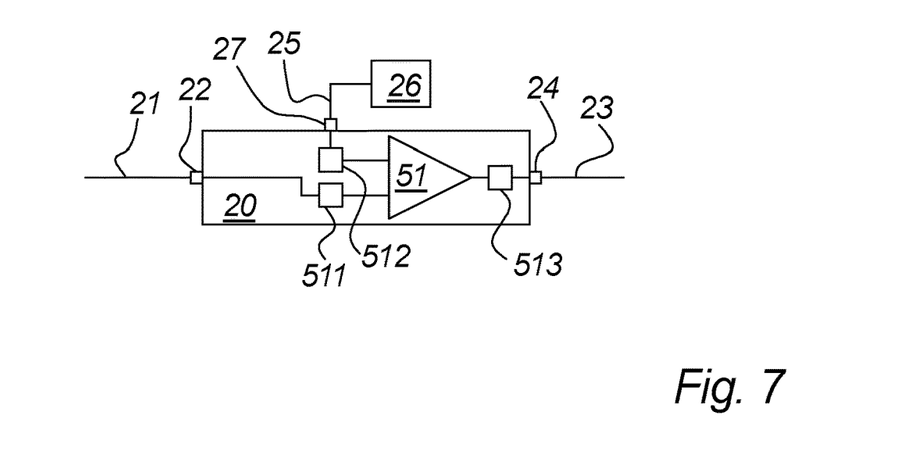
FIG. 7 illustrates a part of an embodiment of a safety circuit with comparator technology.

FIG. 7 illustrates an example of an embodiment of an evaluation module 20 based on comparator technology 51, e.g. as may be used in the embodiments described above with reference to FIGS. 1-5. A reference source 26 established a reference value 25 which is received by a reference input 27, all for example as described above with reference to FIG. 3. A comparator 51 receives the reference value 25 and the input signal 21, and establishes an output signal 23. A person of ordinary skill in the art of comparators will appreciate that further components and implementation for establishing the comparator functionality is necessary and well-known in the art. Hence, the comparator technology 51 is preferably implemented so as to compare the reference value and the input signal, and output a signal indicating the result of the comparison.

For example, for use in a first evaluation module 20 receiving an input signal 21 which responds with increasing voltage to increasing temperature, e.g. as described with reference to FIG. 2 above, the comparator technology should preferably be implemented so as to establish a "low" value, i.e. signal alarm as described with reference to FIG. 1 above, at the output signal 23 when the input signal exceeds the reference value. On the contrary, when used in a second evaluation module 30 receiving an input signal 31 which responds with decreasing voltage to increasing temperature, e.g. as described with reference to FIG. 2 above, the comparator technology should preferably be implemented so as to establish a "low" value, i.e. signal alarm as described with reference to FIG. 1 above, at the output signal 33 when the input signal is below the reference value.

In various embodiments an input signal preparer 511 and/or reference value preparer 512 may be provided as illustrated in order to for example gain, convert, filter, invert, etc. the signals in certain implementations to make the input signal and the reference value compatible. In various embodiments a temperature state evaluator 513 may be applied to the output signal as illustrated in order to for example invert, buffer, gain, convert, filter, etc. the comparator output to make the output signal compatible with a subsequent tripping monitoring unit 40 or other recipient.

Figure 8:
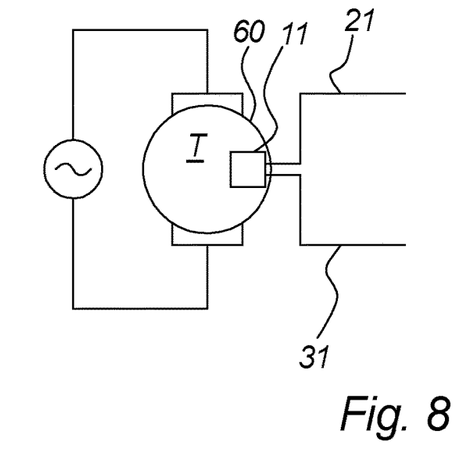
FIG. 8 illustrates a part of an embodiment of a safety circuit with a motor as load.

FIG. 8 illustrates a part of an embodiment of a safety circuit e.g. as described above with reference to FIGS. 1-7, where the temperature-dependent element 11 is installed in an electrically power load 60, e.g. a motor. The motor or other load may for example be driven by a single alternating current phase as illustrated, but may alternatively be driven by any direct current, be frequency-controlled by switch-mode supply, etc.

Figure 9:
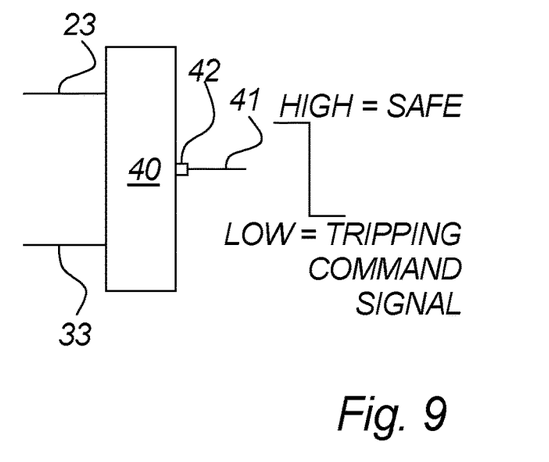
FIG. 9 illustrates an embodiment of a tripping monitoring unit of a safety circuit.

FIG. 9 illustrates in more detail an example of a tripping monitoring unit 40 and its output 42 and a trip command signal 41 according to an embodiment of a safety circuit, e.g. as described above with reference to FIG. 1-8. As illustrated, the tripping monitoring unit receives the first and second output signals 23, 33, and if any of those indicate a critical temperature state such as, e.g., "too high", preferably defined as a "low" signal, the tripping monitoring unit establishes a trip command signal as the single output of the complete redundant system. In a preferred embodiment, the trip command signal is defined as the trip signal output 42 being "low", whereas acceptable or safe states are defined as the trip signal output 42 being "high". This is preferred as a non-working tripping monitoring unit, e.g. due to power loss, typically defaults to "low" on the output, thereby not falsely indicating that everything is fine. In various embodiments the trip command signal 41 may have other encodings or signal formats.

Figure 10:
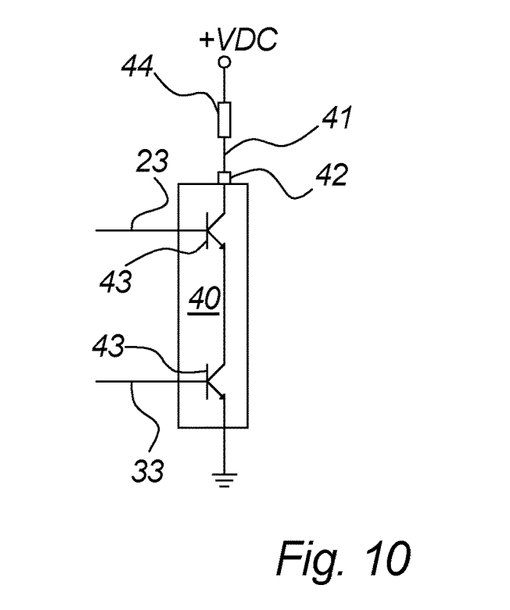
FIG. 10 illustrates another embodiment of a tripping monitoring unit of a safety circuit.

FIG. 10 illustrates another embodiment of a tripping monitoring unit 40 of a safety circuit 1 as for example described above with reference to FIGS. 1-9. The tripping monitoring unit is for example implemented with two transistors 43, having their bases coupled to the first and second output signals 23, 33, respectively, and configured to function as switches that close the circuit from +VDC to ground through a tripping command signal load 44 upon positive potential on the bases. In the preferred embodiment described above, non-alarming temperature at the temperature-dependent element results in "high" outputs from both evaluation modules, thereby activating both transistors and closing the circuit to allow current to flow through the tripping command signal load 44. Hence, a "high" value also appears at the trip signal output 42. As soon as the input to one or both of the bases goes "low", the respective transistor opens, and the trip signal output goes "low", thereby establishing the tripping command signal 41, meaning alarm. In various embodiments further components may be implemented around the transistors to support circuit reliability and robustness as appreciated by a person skilled in the art of transistor switch applications.

Figure 11:
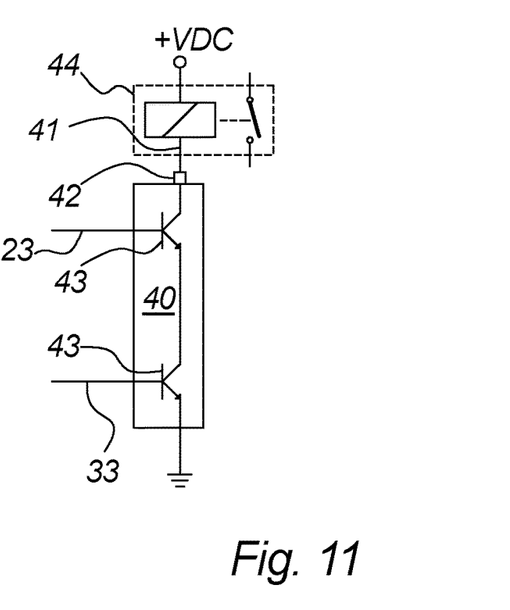
FIG. 11 illustrates another embodiment of a tripping monitoring unit of a safety circuit.

FIG. 11 illustrates in more detail an embodiment of applying a specific tripping command signal load 44, for example in any of the embodiments described above with reference to FIGS. 1-10. Based on a trip monitoring unit 40 defining a "low" output as indicating a temperature alarm, for example implemented as shown in FIG. 10, the tripping command signal load 44 may for example be a relay with a normal open contact. Such relay closes the secondary circuit when current runs, i.e. the trip signal output is "high", and opens the secondary circuit when passive, i.e. a trip command signal is establish by applying a "low" on the output. The relay switch may for example be used in a driver circuit to only allow electrically driven equipment to run as long as the trip signal output is "low", i.e. the temperature is acceptable. The relay switch may also comprise or interact with a system of switches or other electronically controlled switches, e.g. relays. For example, the relay switch 44 may comprise only a low-voltage, low-current switch which in turn control a heavy duty single- or multi-phase relay or other switch. The temperature-dependent element is preferably installed in the electrically driven equipment as described above with reference to FIG. 8.

Figure 12:
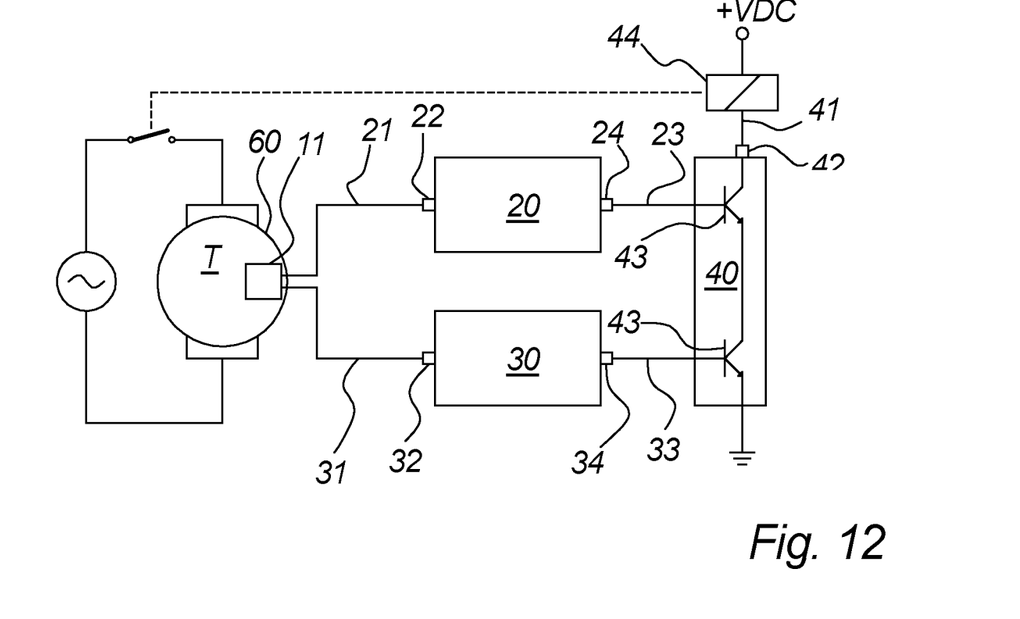
FIG. 12 illustrates another embodiment of a safety circuit.

FIG. 12 illustrates an embodiment of a safety circuit as described above with reference to any of the FIGS. 1-11, and specifically combines an embodiment of FIG. 8 with an embodiment of FIG. 11 above. In a preferred embodiment, the electrically power load 60 which is monitored by the safety circuit by means of the temperature-dependent element 11, is powered through the relay switch 44, and will thereby be disconnected from the supply current immediately upon any one or more of the evaluation modules 20, 30 changing their temperature state to, e.g., "too high".

Figure 13:
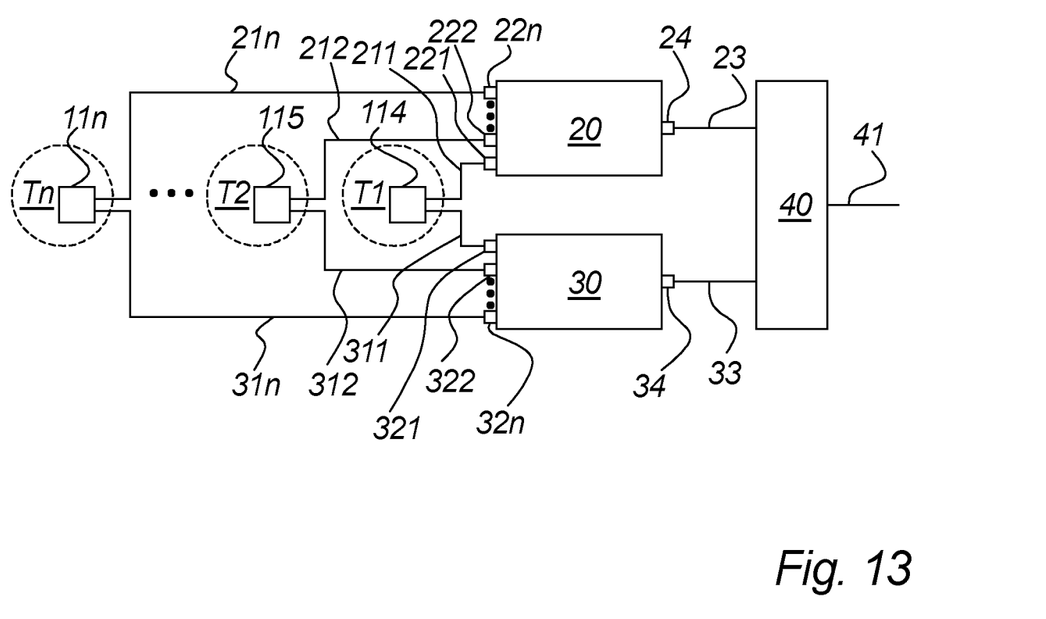
FIG. 13 illustrates another embodiment of a safety circuit with multiple temperature-dependent elements.

FIG. 13 illustrates an embodiment of a safety circuit with multiple temperature-dependent elements 114, 115, 11$n$ depending on multiple temperatures T1, T2, Tn. Each evaluation module 20, 30 provides multiple inputs 221, 222, 22$n$, 321, 322, 32$n$ for receiving input signals 211, 212, 21$n$, 311, 312, 31$n$, from the multiple temperature-dependent elements. Each temperature-dependent element establishes two different temperature-dependent signals, and are coupled with one of the two signals to an input on the first evaluation module 20, and with the other of the two signals to an input on the second evaluation module 30. Hence, redundancy is maintained by scaling the principle described above with reference to FIG. 1-12 to multiple input signals. Inside the evaluation modules, the multiple input signals may in an embodiment be evaluated individually and a temperature state of "too high" or similar be selected whenever one or more of the input signals indicate a too high temperature. In an embodiment only the most critical input signal, e.g. the highest input signal to the first evaluation module and the lowest input signal to the second evaluation module in case of the voltage divider embodiments described above, is evaluated. In various embodiments the different temperature-dependent elements 114, 115, 11$n$ may be equal or different, and the evaluation modules consequently implement or receive one or several reference values.

Figure 14:
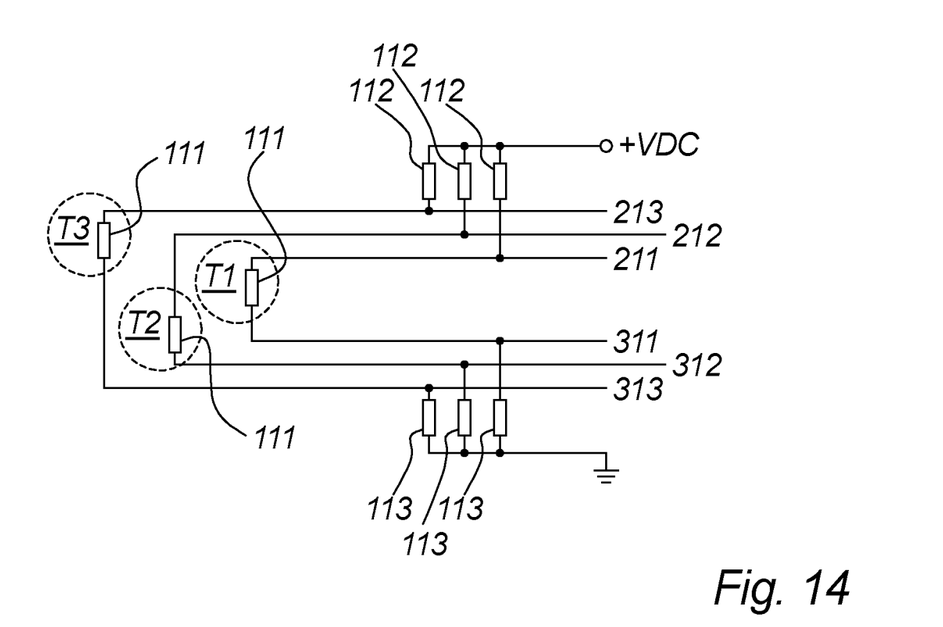
FIG. 14 illustrates an embodiment of multiple voltage dividers of a safety circuit.

FIG. 14 illustrates an embodiment of a voltage divider implementation of the embodiment described above with reference to FIG. 13 with three thermistors 111 measuring three temperatures T1, T2, T3, using three first resistors 112, and three second resistors 113. The voltage dividers may be implemented according to the principles described above with reference to FIG. 2.

Figure 15:
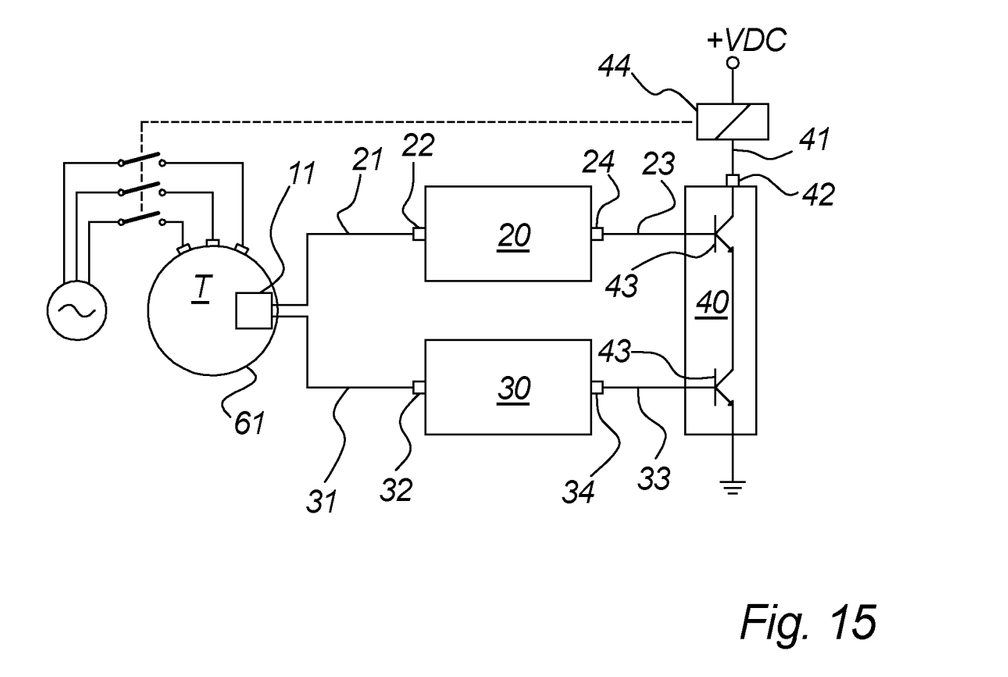
FIG. 15 illustrates another embodiment of a safety circuit with a three-phase load.

FIG. 15 illustrates an embodiment of a safety circuit with a three-phase load 61, and where the relay switch 44 may disconnect all three phases upon establishment of a trip command signal. The various parts of the embodiment may for example be implemented as described above with reference to FIG. 1-14.

The invention claimed is:

1. A safety circuit for temperature tripping with redundancy, the safety circuit comprising:
a first temperature evaluation module comprising a first input arranged to receive a first input signal derived from a temperature by means of a temperature-dependent element; the first temperature evaluation module being arranged to evaluate said first input signal and determine a first temperature state as one of at least two states, whereof at least one state is a trip state; the first temperature evaluation module further comprising a first output arranged to provide a first output signal corresponding to said determined first temperature state;
a second temperature evaluation module comprising a second input arranged to receive a second input signal derived from said temperature by means of said temperature-dependent element, the second input signal being different from said first input signal; the second temperature evaluation module being arranged to evaluate said second input signal and determine a second temperature state as one of at least two states, whereof at least one state is a trip state; the second temperature evaluation module further comprising a second output arranged to provide a second output signal corresponding to said determined second temperature state; and
a tripping monitoring unit connected to said first and second outputs and being arranged to establish a tripping command signal when at least one of said first and second output signals changes to said trip state.

2. The safety circuit according to claim 1, wherein said first input and said second input are connected to different terminals of said temperature-dependent element.

3. The safety circuit according to claim 1, wherein said temperature-dependent element comprises at least one thermistor.

4. The safety circuit according to claim 1, wherein said temperature-dependent element comprises two terminals, and by series-coupling between two resistors forms a voltage divider with two taps for providing said different first and second input signals.

5. The safety circuit according to claim 1, wherein said first temperature evaluation module is arranged to perform said determining said first temperature state based on a first reference value, and said second temperature evaluation module is arranged to perform said determining said second temperature state based on a second reference value different from said first reference value.

6. The safety circuit according to claim 5, wherein said first and second temperature evaluation modules comprise different reference sources (26, 36) to establish said different first and second reference values (25, 35), respectively.

7. The safety circuit according to claim 1, wherein said tripping monitoring unit is arranged to establish said tripping command signal by forcing a trip signal output with a voltage level denoting "high" to change to a voltage level denoting "low".

8. The safety circuit according to claim 1, wherein the safety circuit comprises or is communicatively coupled to an electrically operated switch, controlled in response to said tripping command signal; and wherein said temperature-dependent element is located in an electrically powered load and wherein said electrically operated switch is arranged to disconnect said electrically powered load in response to said tripping command signal.

9. The safety circuit according to claim 1, wherein the safety circuit comprises two or more first and second inputs arranged to receive two or more first and second input signals, respectively, derived from two or more respective temperatures by means of two or more respective temperature-dependent elements so that each pair of a first and second input signal relates to the same of said two or more temperatures and is connected to different terminals of the same of said two or more temperature-dependent elements; the first and second input signal of each pair being different.

10. A safety circuit operation method for temperature tripping with redundancy, the safety circuit operation method comprising the steps of:
providing a first input signal derived from a temperature by means of a temperature-dependent element;
processing the first input signal by a first temperature evaluation module, the processing comprising determining a first temperature state as one of at least two states, whereof at least one state is a trip state, and providing a first output signal corresponding to said determined first temperature state;
providing a second input signal derived from said temperature by means of said temperature-dependent element, the second input signal being different from said first input signal;
processing the second input signal by a second temperature evaluation module, the processing comprising determining a second temperature state as one of at least two states, whereof at least one state is a trip state, and providing a second output signal corresponding to said determined second temperature state;
establishing a tripping command signal when at least one of said first and second output signals changes to said trip state.

11. The safety circuit operation method according to claim 10, wherein said first input signal and said second input signal are connected to different terminals of said temperature-dependent element.

12. The safety circuit operation method according to claim 10, wherein said temperature-dependent element comprises at least one thermistor.

13. The safety circuit operation method according to claim 10, wherein said temperature-dependent element comprises two terminals, and by series-coupling between two resistors forms a voltage divider with two taps for said providing said different first and second input signals.

14. The safety circuit operation method according to claim 10, wherein said processing by said first temperature evaluation module uses a first reference value to determine said first temperature state, and said processing by said second temperature evaluation module uses a second reference value different from said first reference value to determine said second temperature state.

15. The safety circuit operation method according to claim 10, wherein said step of establishing said tripping command signal comprises forcing a trip signal output with a voltage level denoting "high" to change to a voltage level denoting "low".

16. The safety circuit operation method according to claim 1, wherein the method further comprises a step of operating an electrically operated switch on the basis of said tripping command signal; and wherein said temperature-dependent element is located in an electrically powered load, and wherein said method comprises a step of disconnecting said electrically powered load in response to said tripping command signal by means of said electrically operated switch.

17. The safety circuit operation method according to claim 10, wherein the method further comprises providing two or more first and second input signals derived from two or more respective temperatures by means of two or more respective temperature-dependent elements so that each pair of a first and second input signal relates to the same of said two or more temperatures and is connected to different terminals of the same of said two or more temperature-dependent elements; the first and second input signal of each pair being different.

18. The safety circuit operation method according to claim 17, wherein the method comprises
processing said two or more first input signals by said first temperature evaluation module, the processing comprises determining said first temperature state as said trip state when at least one of said two or more first input signals evaluates to said trip state; and
processing said two or more second input signals by said second temperature evaluation module, the processing comprises determining said second temperature state as said trip state when at least one of said two or more second input signals evaluates to said trip state.

19. An electrically powered motor comprising a safety circuit for temperature tripping with redundancy;
the safety circuit with redundancy comprising:
a first temperature evaluation module comprising a first input arranged to receive a first input signal derived from a temperature by means of a temperature-dependent element; the first temperature evaluation module being arranged to evaluate said first input signal and determine a first temperature state as one of at least two states, whereof at least one state is a trip state; the first temperature evaluation module further comprising a first output arranged to provide a first output signal corresponding to said determined first temperature state;
a second temperature evaluation module comprising a second input arranged to receive a second input signal derived from said temperature by means of said temperature-dependent element, the second input signal being different from said first input signal; the second temperature evaluation module being arranged to evaluate said second input signal and determine a second temperature state as one of at least two states, whereof at least one state is a trip state; the second temperature evaluation module further comprising a second output arranged to provide a second output signal corresponding to said determined second temperature state; and
a tripping monitoring unit connected to said first and second outputs and being arranged to establish a tripping command signal when at least one of said first and second output signals changes to said trip state; and
said electrically powered motor further comprising at least one temperature-dependent element of which one terminal is connected to said first input of said safety circuit and another terminal is connected to said second input of said safety circuit.

20. The electrically powered motor according to claim 19 comprising an electrically operated switch arranged to disconnect said motor from one or more supply phases in response to said tripping command signal of said safety circuit.

* * * * *